(12) United States Patent
Haller (10) Patent No.: US 6,887,050 B2
(45) Date of Patent: May 3, 2005

(54) COMPRESSOR HAVING BEARING SUPPORT

(75) Inventor: David K. Haller, Adrian, MI (US)

(73) Assignee: Tecumseh Products Company, Tecumseh, MI (US)

( * ) Notice: Subject to any disclaimer, the term of this patent is extended or adjusted under 35 U.S.C. 154(b) by 0 days.

(21) Appl. No.: 10/657,653

(22) Filed: Sep. 8, 2003

(65) Prior Publication Data

US 2004/0057859 A1 Mar. 25, 2004

Related U.S. Application Data

(60) Provisional application No. 60/412,890, filed on Sep. 23, 2002.

(51) Int. Cl.[7] ................................ F01C 1/02
(52) U.S. Cl. .................. 418/55.1; 418/55.6; 418/96; 418/94; 184/6.17
(58) Field of Search .............. 418/55.1, 55.6, 418/96, 94; 184/6.17, 6.16

(56) References Cited

U.S. PATENT DOCUMENTS

| | | |
|---|---|---|
| 2,661,172 A | 12/1953 | Needham |
| 3,039,725 A | 6/1962 | Kerley, Jr. |
| RE25,569 E | 5/1964 | Coron et al. |
| 3,145,960 A | 8/1964 | Langdon |
| 3,749,340 A | 7/1973 | Williams et al. |
| 3,785,167 A | 1/1974 | Sahs |

(Continued)

FOREIGN PATENT DOCUMENTS

| | | | |
|---|---|---|---|
| JP | 61087994 | 5/1986 | |
| JP | 402061382 A | 3/1990 | |
| JP | 407259764 A | 10/1995 | |
| JP | 10148191 A | * 6/1998 | ........... F04C/18/02 |
| JP | 2001020881 A | 1/2001 | |
| JP | 20020217229 A | 1/2002 | |
| JP | 2002098056 A | * 4/2002 | ........... F04B/39/04 |

OTHER PUBLICATIONS

Appl. No. 10/657,311 entitled Compressor Assembly Having Crankcase, filed Sep. 8, 2003.
Appl. No. 10/657,637 entitled Compressor Having Discharge Valve, filed Sep. 8, 2003.
Appl. No. 10/657,382 entitled Compressor Mounting Bracket and Method of Making, filed Sep. 8, 2003.
Appl. No. 10/657,309 entitled Compressor Having Alignment Bushing and Assembly Method, filed Sep. 8, 2003.
Appl. No. 10/657,310 entitled Compressor Having Counterweight Shield, filed Sep. 8, 2003.
Appl. No. 10/657,582 entitled Compressor Discharge Assembly, filed Sep. 8, 2003.
Appl. No. 10/657,652 entitled Compressor Assembly Having Baffle, Sep. 8, 2003.

*Primary Examiner*—Thomas Denion
*Assistant Examiner*—Theresa Trieu
(74) *Attorney, Agent, or Firm*—Baker & Daniels (57) ABSTRACT

A scroll compressor having fixed and orbiting scrolls. The scrolls are disposed within a housing which defines a plenum having an oil sump. A shaft is coupled at one end to the orbiting scroll and is also coupled to a motor located in the housing. A bearing support is secured within the housing and has a central boss with a bearing mounted therein. The bearing supports the shaft opposite the orbiting scroll. The bearing support includes an outer ring and a plurality of support arms extending from the outer ring to the boss. The lowermost portion of the outer ring freely extends for an arc of approximately 120 degrees between adjacent support arms. The lowermost portion of the outer ring is disposed within the oil sump and includes a recessed portion defining a passage between the outer ring and housing for communicating lubricating oil.

14 Claims, 9 Drawing Sheets

U.S. PATENT DOCUMENTS

| | | | |
|---|---|---|---|
| 4,089,613 A | 5/1978 | Babbitt, Jr. |
| 4,244,680 A | 1/1981 | Ishizuka et al. |
| 4,389,171 A | 6/1983 | Eber et al. |
| 4,416,594 A | 11/1983 | Ichikawa |
| 4,497,615 A | 2/1985 | Griffith |
| 4,518,276 A | 5/1985 | Mitchell |
| 4,552,518 A | 11/1985 | Utter |
| 4,557,677 A | 12/1985 | Hasegawa |
| 4,685,188 A | 8/1987 | Goy |
| 4,767,293 A | 8/1988 | Caillat et al. |
| 4,792,288 A | 12/1988 | Gromoll et al. |
| 4,818,198 A | 4/1989 | Tamura et al. |
| 4,877,382 A | 10/1989 | Caillat et al. |
| 4,992,033 A | 2/1991 | Caillat et al. |
| 5,012,896 A | 5/1991 | Da Costa |
| 5,055,010 A | 10/1991 | Logan |
| 5,062,779 A | 11/1991 | Da Costa |
| 5,110,268 A | 5/1992 | Sakurai et al. |
| 5,114,322 A | 5/1992 | Caillat et al. |
| 5,137,437 A * | 8/1992 | Machida et al. ............ 418/55.1 |
| 5,176,506 A | 1/1993 | Siebel |
| 5,211,031 A | 5/1993 | Murayama et al. |
| RE34,297 E | 6/1993 | Elson |
| 5,219,281 A | 6/1993 | Caillat et al. |
| 5,222,885 A | 6/1993 | Ramshankar et al. |
| 5,224,845 A | 7/1993 | Mangyo et al. |
| 5,240,391 A | 8/1993 | Ramshankar et al. |
| 5,247,738 A | 9/1993 | Yoshii |
| 5,312,234 A | 5/1994 | Yoshii |
| 5,345,785 A | 9/1994 | Sekigami et al. |
| 5,345,970 A | 9/1994 | Leyderman et al. |
| 5,346,375 A | 9/1994 | Akiyama et al. |
| 5,348,455 A | 9/1994 | Herrick et al. |
| 5,370,156 A | 12/1994 | Peracchio et al. |
| 5,391,066 A | 2/1995 | Sawai et al. |
| 5,427,511 A | 6/1995 | Caillat et al. |
| 5,474,433 A | 12/1995 | Chang et al. |
| 5,487,648 A | 1/1996 | Alfano et al. |
| 5,522,715 A | 6/1996 | Watanabe et al. |
| 5,531,577 A | 7/1996 | Hayase et al. |
| 5,533,875 A | 7/1996 | Crum et al. |
| 5,579,651 A | 12/1996 | Sugiyama et al. |
| 5,580,233 A | 12/1996 | Wakana et al. |
| 5,597,293 A | 1/1997 | Bushnell et al. |
| 5,597,296 A | 1/1997 | Akazawa et al. |
| 5,634,781 A | 6/1997 | Yoshida et al. |
| 5,645,408 A | 7/1997 | Fujio et al. |
| 5,660,539 A | 8/1997 | Matsunaga et al. |
| 5,683,237 A | 11/1997 | Hagiwara et al. |
| 5,695,326 A | 12/1997 | Oka et al. |
| 5,716,202 A | 2/1998 | Koyama et al. |
| 5,720,601 A | 2/1998 | Tark et al. |
| 5,745,992 A | 5/1998 | Caillat et al. |
| 5,752,688 A | 5/1998 | Campbell et al. |
| 5,769,126 A | 6/1998 | Cho |
| 5,772,411 A | 6/1998 | Crum et al. |
| 5,772,416 A | 6/1998 | Caillat et al. |
| 5,775,894 A | 7/1998 | Kosco, Jr. |
| 5,810,572 A * | 9/1998 | Yamamoto et al. ........ 418/55.6 |
| 5,829,959 A | 11/1998 | Tsubono et al. |
| 5,863,190 A | 1/1999 | Yamamoto et al. |
| 5,913,892 A | 6/1999 | Kwon |
| 5,931,649 A | 8/1999 | Caillat et al. |
| 5,931,650 A | 8/1999 | Yasu et al. |
| 5,947,709 A | 9/1999 | Koyama et al. |
| 5,964,581 A | 10/1999 | Iizuka et al. |
| 6,000,917 A | 12/1999 | Smerud et al. |
| 6,011,336 A | 1/2000 | Mathis et al. |
| 6,027,321 A | 2/2000 | Shim et al. |
| 6,039,551 A * | 3/2000 | Takeuchi et al. ............. 418/94 |
| 6,050,794 A | 4/2000 | Noboru et al. |
| 6,056,523 A | 5/2000 | Won et al. |
| 6,106,254 A | 8/2000 | Hirooka et al. |
| 6,132,191 A | 10/2000 | Hugenroth et al. |
| 6,139,291 A | 10/2000 | Perevozchikov |
| 6,156,106 A | 12/2000 | Kamata |
| 6,162,035 A | 12/2000 | Hayano et al. |
| 6,167,719 B1 | 1/2001 | Yakumaru et al. |
| 6,171,076 B1 | 1/2001 | Yakumaru et al. |
| 6,179,589 B1 | 1/2001 | Bass et al. |
| 6,186,753 B1 | 2/2001 | Hugenroth et al. |
| 6,224,356 B1 | 5/2001 | Dewar et al. |
| 6,227,830 B1 | 5/2001 | Fields et al. |
| 6,247,910 B1 | 6/2001 | Yokoyama |
| 6,261,073 B1 | 7/2001 | Kumazawa |
| 6,264,446 B1 | 7/2001 | Rajendran et al. |
| 6,280,154 B1 | 8/2001 | Clendenin et al. |
| 6,299,423 B1 | 10/2001 | Perevozchikov |
| 6,305,912 B1 | 10/2001 | Svendsen et al. |
| 6,402,485 B2 | 6/2002 | Hong et al. |
| 2001/0006603 A1 | 7/2001 | Hong et al. |
| 2001/0055536 A1 | 12/2001 | Bernardi et al. |

* cited by examiner

COMPRESSOR HAVING BEARING SUPPORT

CROSS REFERENCE TO RELATED APPLICATIONS

This application claims priority under 35 U.S.C. 119(e) of U.S. provisional patent application Ser. No. 60/412,890 filed on Sep. 23, 2002 entitled COMPRESSOR HAVING BEARING SUPPORT the disclosure of which is hereby incorporated by reference.

BACKGROUND OF THE INVENTION

1. Field of the Invention

The present invention relates to scroll compressors and, more particularly to a bearing support for a scroll compressor.

2. Description of the Related Art

Scroll compressors conventionally include a fixed scroll member and an orbiting scroll member with a shaft operably coupled to the orbiting scroll to impart motion thereto. The shaft typically extends through a motor and conventional designs will oftentimes include a bearing support positioned at the end of the motor opposite the orbiting scroll for rotatably supporting one end of the shaft. Such bearing supports conventionally include a plurality of support arms which are symmetrically arranged and disposed at an equidistant circumferential spacing about the axis of the shaft. Such bearing supports may be at least partially positioned in an oil sump formed within the compressor housing and an improved bearing support that does not adversely impact the functioning of the oil sump is desirable.

SUMMARY OF THE INVENTION

The present invention provides a compressor having an improved bearing support which facilitates the use of an oil sump within the compressor housing.

The invention comprises, in one form thereof, a compressor assembly which includes a housing defining an interior plenum wherein a lower portion of the plenum defines an oil sump. A compressor mechanism and a motor are disposed within the housing. A shaft having a first end and an opposite second end extends through and is operably coupled to the motor. The shaft defines a rotational axis having a substantially horizontal orientation wherein the first end of the shaft is operably coupled to the compressor mechanism and the second end extends outwardly from the motor. A bearing support is secured within the housing and includes a radially inner shaft support member, a radially outer support member, and plurality of support arms extending between the inner and outer support members. The outer support member has a radially outer surface wherein a substantial portion of the radially outer surface is engaged with the housing. The radially outer surface and the housing define a first gap therebetween proximate a lowermost portion of the outer support member and wherein the lowermost portion extends freely through an arc of at least approximately 120 degrees between lowermost adjacent ones of the plurality of support arms.

The radially outer surface of the outer support member and the housing may also define a second gap disposed vertically above the oil sump. In some embodiments, the plurality of support arms define a plurality of angles between adjacent pairs of the support arms with the plurality of angles comprising at least two angles having different magnitudes.

The invention comprises, in another form thereof, a compressor assembly that includes a housing defining an interior plenum having a low pressure chamber and a discharge pressure chamber wherein a portion of the low pressure chamber defines an oil sump. A compressor mechanism and a motor are disposed within the housing. A shaft having a first end and an opposite second end extends through and is operably coupled to the motor. The first end of the shaft is operably coupled to the compressor mechanism and the second end extends outwardly from the motor. The shaft defines a rotational axis having a substantially horizontal orientation. A bearing support is secured within the housing and includes a radially inner shaft support member, a radially outer support member, and plurality of support arms extending between the inner and outer support members. The outer support member has a radially outer surface wherein a substantial portion of the radially outer surface is engaged with the housing. The radially outer surface and the housing define a first gap therebetween proximate a lowermost portion of the outer support member with the lowermost portion being positioned within the oil sump.

The present invention comprises, in yet another form thereof, a compressor assembly that includes a housing having a substantially cylindrical section and defining an interior plenum with a low pressure chamber and a discharge pressure chamber. A lower portion of the plenum defines an oil sump. A compressor mechanism and a motor are disposed within the housing. A shaft having a first end and an opposite second end extends through and is operably coupled to the motor. The first end of the shaft is operably coupled to the compressor mechanism and the second end extends outwardly from the motor. The shaft defines a rotational axis having a substantially horizontal orientation. A bearing support is secured within the substantially cylindrical section of the housing and includes a radially inner shaft support member, a substantially circular radially outer support member, and plurality of support arms extending between the inner and outer support members. The outer support member has a radially outer surface wherein a substantial portion of the radially outer surface is engaged with the housing. The radially outer surface and the housing also define a first gap therebetween proximate a lowermost portion of the outer support member. The lowermost portion of the outer support member extends freely through an arc of at least approximately 120 degrees between lowermost adjacent ones of the plurality of support arms and is positioned within the oil sump.

An advantage of the present invention is that by providing a bearing support which has its lowermost support arms spread apart at a relatively wide angle, the extent to which the support arms extend into the oil sump can be reduced and, thus, the volume of oil displaced by such support arms is also reduced.

Another advantage is that by providing a recess along the bottom outer surface of the outer ring of the bearing support, a passage can be provided between the housing of the compressor and the outer ring to allow for the communication of lubricating oil therethrough.

Yet another advantage is that by providing a recess in the outer ring of the bearing support above the oil sump, the recess allows for the passage of refrigerant and thus the equalization of pressure on opposite sides of the outer ring within the compressor housing.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the exemplification set out herein illustrates an embodiment of the invention, the embodiment disclosed below is not intended to be exhaustive or to be construed as limiting the scope of the invention to the precise form disclosed.

DESCRIPTION OF THE PRESENT INVENTION

Figure 1:
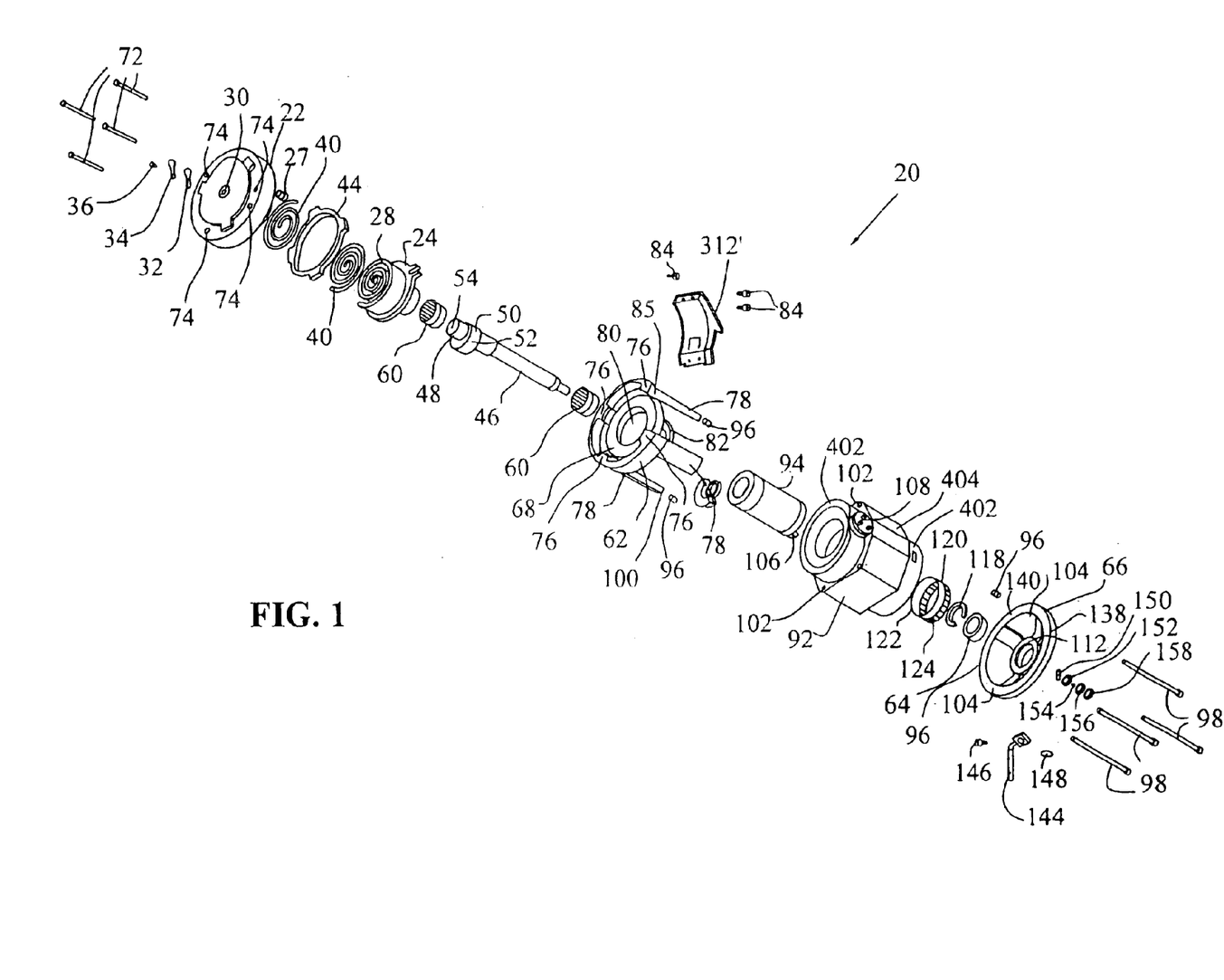
FIG. 1 is an exploded view of a scroll compressor in accordance with the present invention.

In accordance with the present invention, a scroll compressor 20 is shown in an exploded view in FIG. 1. Scroll compressor 20 includes a fixed or stationary scroll member 22 which is engaged with an orbiting scroll member 24. Fixed and orbiting scroll members 22, 24 respectively include an involute wrap 26, 28. A refrigerant is compressed between scroll members 22, 24 in pockets which are formed between involute wraps 26, 28 and which migrate radially inwardly as scroll member 24 orbitally moves relative to fixed scroll member 22. The refrigerant enters the space between the scroll members at low pressure through inlet 23 (FIG. 4) located at the radially outer portion of the space formed between scroll members 22, 24 and is discharged at a relatively high pressure through a discharge port 30 located proximate the radial center of fixed scroll member 22. Scroll members 22, 24 each have carbon steel tip seals 40 mounted in recesses located in the distal tips of involute wraps 26, 28, for providing a seal between involute wraps 26, 28 and the base plate of the opposing scroll member.

A one-way valve allows compressed refrigerant to be discharged into a discharge chamber or plenum 38 and prevents compressed refrigerant located in discharge plenum 38 from reentering discharge port 30. The valve includes an exhaust valve leaf 32 which sealingly engages fixed scroll member 22 at discharge port 30 and an exhaust valve retainer 34. Valve leaf 32 is secured between fixed scroll member 22 and valve retainer 34. Valve retainer 34 has a bend at its distal end which allows valve leaf 32 to flex outwardly away from discharge port 30 when gas is compressed between scroll members 22, 24 and thereby permit the passage of high pressure gas into discharge plenum 38. Valve retainer 34 limits the extent to which valve leaf 32 may flex outwardly away from discharge port 30 to prevent damage from excessive flexing of valve leaf 32. A threaded fastener 36 secures valve retainer 34 and valve leaf 32 to fixed scroll member 22. An alternative valve that may be used with compressor 20 is described by Haller et al. in U.S. Provisional Patent Application Ser. No. 60/412,905 entitled COMPRESSOR HAVING DISCHARGE VALVE filed on Sep. 23, 2002 which is hereby incorporated herein by reference. Pressure relief valve 27 is positioned between scroll members 22, 24 to allow discharge pressure gas to be directed into the suction pressure inlet in the event of overpressurization.

An Oldham ring 44 is disposed between fixed scroll member 22 and orbiting scroll member 24 to control the relative motion between orbiting scroll member 24 and fixed scroll member 22. Orbiting scroll 24 is mounted on an eccentrically positioned extension 48 on shaft 46 and rotation of shaft 46 imparts a relative orbital movement between orbiting scroll 24 and fixed scroll 22. The use of shafts having eccentrically positioned extensions and Oldham rings to impart a relative orbital motion between scroll members of a compressor is well known to those having ordinary skill in the art.

A counterweight 50 (FIG. 1) includes a collar portion with an opening through which shaft 46 is inserted. Counterweight 50 is not shown in FIGS. 3 and 4. Counterweight 50 also includes a partially cylindrical wall 52 which eccentrically loads shaft 46 to counterbalance the eccentric loading of shaft 46 by orbiting scroll 24. Counterweight 50 is heat shrink fitted onto shaft 46 in the disclosed embodiment. Shaft 46 includes an internal passageway 54 extending the longitudinal length of shaft 46 and secondary passages 56 extending transversely from passageway 54 to the radially outer surface of shaft 46. Passageways 54, 56 communicate lubricating oil between oil sump 58, which is located in the suction pressure chamber of the compressor housing, and bearings rotatably engaging shaft 46.

Two roller bearings 60 are positioned on shaft 46 where shaft 46 respectively engages orbiting scroll 24 and crankcase 62. A ball bearing 64 is positioned near the opposite end of shaft 46 and is mounted within bearing support 66. Shaft 46 may be supported in a manner similar to that described by Haller et al. in U.S. patent application Ser. No. 09/964,241 filed Sep. 26, 2001 entitled SHAFT AXIAL COMPLIANCE MECHANISM and which is hereby incorporated herein by reference.

Crankcase 62 is secured to fixed scroll 22 with threaded fasteners 72 which pass through apertures 74 located in fixed scroll 22 and engage threaded bores 76 in crankcase 62. Crankcase 62 includes a thrust surface 68 which slidably engages orbiting scroll 24 and restricts movement of orbiting scroll 24 away from fixed scroll 22. Crankcase 62 also includes four legs 78 which secure the crankcase to stator 92 as described in greater detail below. Shaft 46 extends through opening 80 in crankcase 62. Crankcase 62 includes a shroud portion 70 which is disposed between legs 78 in the lower portion of the horizontal compressor housing and partially encloses a space within which counterweight 50 rotates. Shroud 70 includes an opening 81 along its upper portion which permits the equalization of pressure between the space partially enclosed by shroud 70 and the remainder of the low pressure chamber or plenum 39 of compressor 20. Low pressure plenum 39 includes that space within compressor housing 88 located between orbiting scroll 24 and end cap 168 and receives the suction pressure refrigerant which is returned to compressor 20 through inlet tube 86.

Figure 4:
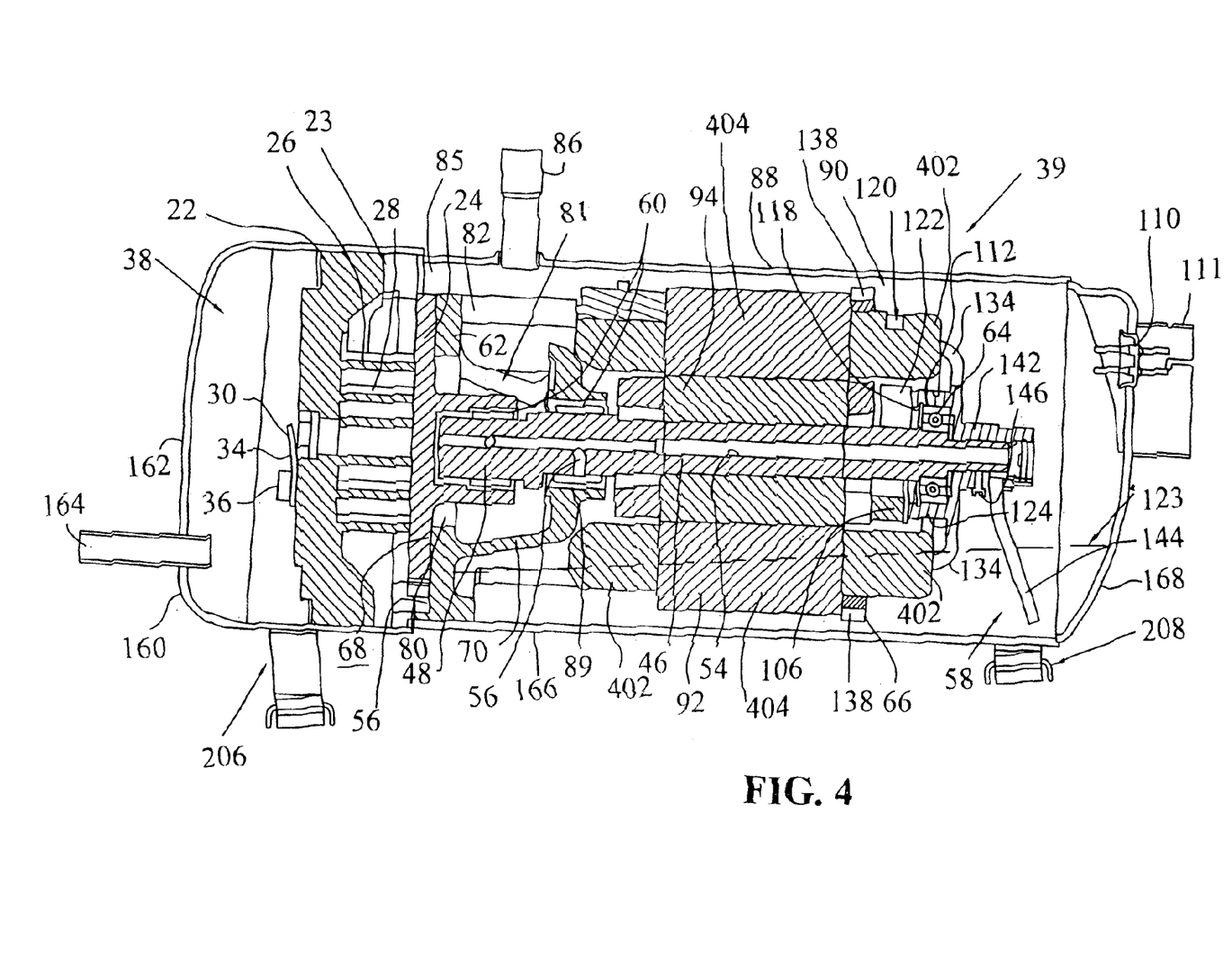
FIG. 4 is a sectional view of the compressor of FIG. 2 taken along line 4—4.

A suction baffle 82 (FIG. 1) is secured between two legs 78 using fasteners. The illustrated fasteners are socket head cap screws 84 but other fasteners such as self-tapping screws and other fastening methods may also be used to secure suction baffle 82. Suction baffle 82 is positioned proximate inlet tube 86 as best seen in FIG. 4. Refrigerant enters compressor housing 88 through inlet tube 86 and suction baffle 82 is positioned in the flow path of entering refrigerant to redirect the refrigerant along the outer perimeter of crankcase 62. The outer perimeter of crankcase 62 includes a recess 85 adjacent suction baffle 82 which defines a passage to inlet 23. Crankcase 62 includes a sleeve portion 89 in which roller bearing 60 is mounted for rotatably supporting shaft 46. Sleeve 89 is supported by shroud portion 70 opposite opening 80. An alternative crankcase and suction baffle assembly may include an inlet to housing 88 located at mid-height wherein the suction baffle has a narrow opening located between inlet 86 and inlet 23 which extends transverse to the flow direction of refrigerant along the suction baffle to strip oil from the suction baffle. Crankcases and suction baffles which may be used with compressor 20 are described by Haller, et al. in U.S. Provisional Patent Application Ser. No. 60/412,768 entitled COMPRESSOR ASSEMBLY filed on Sep. 23, 2002 which is hereby incorporated herein by reference.

A motor 90 is disposed adjacent crankcase 62 and includes a stator 92 and a rotor 94. Bushings 96 are used to properly position stator 92 with respect to crankcase 62 and bearing support 66 when assembling compressor 20. During assembly, crankcase 62, motor 90 and bearing support 66 must have their respective bores through which shaft 46 is inserted precisely aligned. Smooth bore pilot holes 100, 102, 104 which are precisely located relative to these bores are provided in crankcase 62, motor 90 and bearing support 66. Alignment bushings 96 fit tightly within the pilot holes to properly align crankcase 62, motor 90 and bearing support 66. Bolts 98 (FIG. 1) are then used to secure bearing support 66, motor 90 and crankcase 62 together. Pilot holes 100 are located on the distal ends of legs 78 in crankcase 62 and bolts 98 are threaded into engagement with threaded portions of holes 100 when securing crankcase 62, motor 90 and bearing support 66 together. Pilot holes 102 located in stator 92 of motor 90 extend through stator 92 and allow the passage of bolts 98 therethrough. Pilot holes 104 located in bearing support 66 also allow the passage of the shafts of bolts 98 therethrough but prevent the passage of the heads of bolts 98 which bear against bearing support 66 when bolts 98 are engaged with crankcase 62 to thereby secure crankcase 62, motor 90 and bearing support 66 together. In the disclosed embodiment, bushings 96 are hollow sleeves and bolts 98 are inserted through bushings 96. Alternative embodiments, however, could employ pilot holes and bushings to properly align crankcase 62, motor 90 and bearing support 66 with different methods of securing these parts together. For example, the pilot holes could be separate from the openings through which bolts 98 are inserted or alternative methods of securing crankcase 62, motor 90 and bearing support 66 together could be employed with the use of pilot holes and alignment bushings 96. Alignment bushings which may be used with compressor 20 are described by Skinner in U.S. Provisional Patent Application Ser. No. 60/412,868 entitled COMPRESSOR HAVING ALIGNMENT BUSHINGS AND ASSEMBLY METHOD filed on Sep. 23, 2002 which is hereby incorporated herein by reference.

A terminal pin cluster 108 is located on motor 90 and wiring (not shown) connects cluster 108 with a second terminal pin cluster 110 mounted in end cap 168 and through which electrical power is supplied to motor 90. A terminal guard or fence 111 is welded to end cap 168 and surrounds terminal cluster 110. Shaft 46 extends through the bore of rotor 94 and is rotationally secured thereto by a shrink fit whereby rotation of rotor 94 also rotates shaft 46. Rotor 94 includes a counterweight 106 at its end proximate bearing support 66.

As mentioned above, shaft 46 is rotatably supported by ball bearing 64 which is mounted in bearing support 66. Bearing support 66 includes a central boss 112 which defines a substantially cylindrical opening 114 in which ball bearing 64 is mounted. A retaining ring 118 is fitted within a groove 116 located in the interior of opening 114 to retain ball bearing 64 within boss 112. An oil shield 120 is secured to boss 112 and has a cylindrical portion 122 which extends towards motor 90 therefrom. Counterweight 106 is disposed within the space circumscribed by cylindrical portion 122 and is thereby shielded from the oil located in oil sump 58, although it is expected that the oil level 123 will be below oil shield 120 under most circumstances, as shown in FIG. 4. Oil shield 120 is positioned so that it inhibits the impacting of counterweight 106 on oil migrating to oil sump 58 and also inhibits the agitation of oil within oil sump 58 which might be caused by the movement of refrigerant gas created by the rotation of eccentrically positioned counterweight 106. A second substantially cylindrical portion 124 of oil shield 120 has a smaller diameter than the first cylindrical portion 122 and has a plurality of longitudinally extending tabs with radially inwardly bent distal portions. Boss 112 includes a circular groove and oil shield 120 is secured to boss 112 by engaging the radially inwardly bent distal portions with the circular groove. An oil shield which may be used with compressor 20 is described by Skinner in U.S. Provisional Patent Application Ser. No. 60/412,838 entitled COMPRESSOR HAVING COUNTERWEIGHT SHIELD filed on Sep. 23, 2002 which is hereby incorporated herein by reference.

Support arms 134 extend between boss 112 and outer ring 136 of bearing support 66. The radially outer surface 139 defining the outer perimeter of ring 136 is press fit into engagement with housing 88 to secure bearing support 66 therein. The interior perimeter of outer ring 136 faces the windings of stator 92 when bearing support 66 is engaged with motor 90. Flats 138 are located on the outer perimeter of ring 136 and the upper flat 138 facilitates the equalization of pressure within suction plenum by allowing refrigerant to pass between outer ring 136 and housing 88. Flat 138 located along the bottom of ring 136 allows oil in oil sump 58 to pass between ring 136 and housing 88. A notch 140 located on the interior perimeter of outer ring 136 may be used to locate bearing support 66 during machining of bearing support 66 and also facilitates the equalization of pressure within suction plenum 39 by allowing refrigerant to pass between stator 92 and ring 136.

Figure 5:
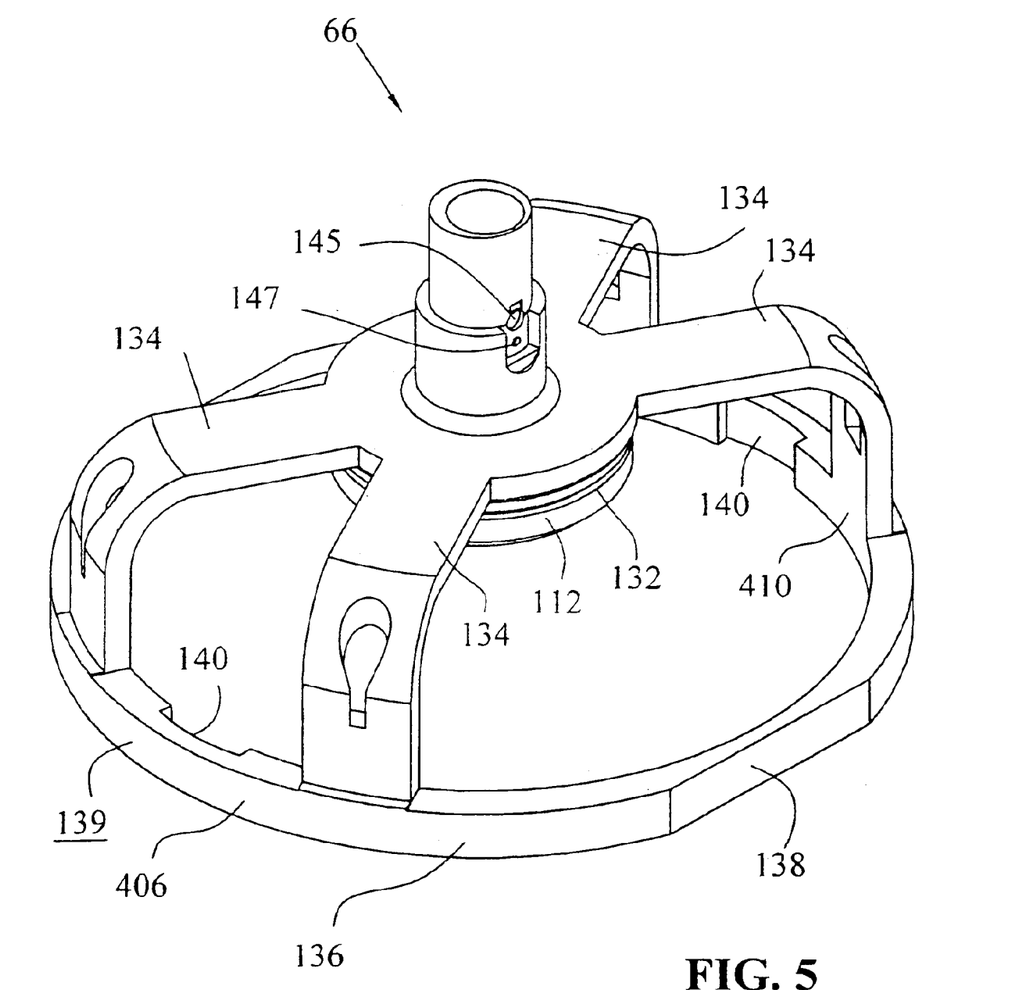
FIG. 5 is a perspective view of a bearing support.
Figure 6:
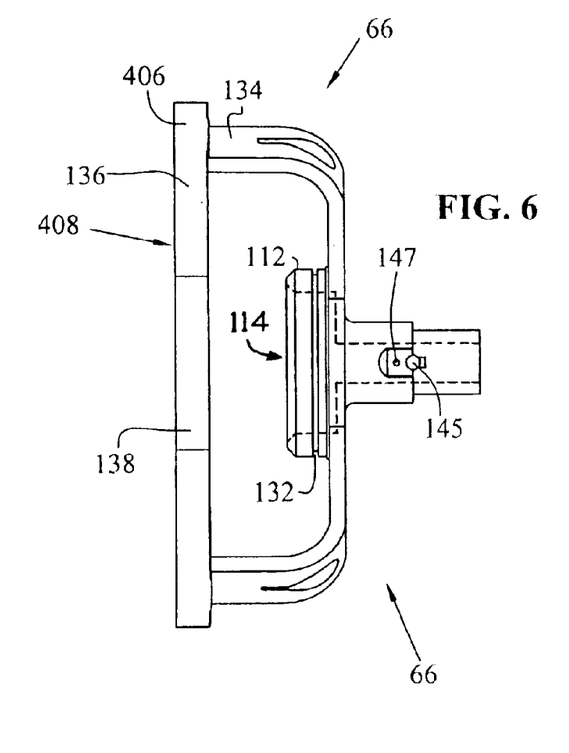
FIG. 6 is a rear view of the bearing support of FIG. 5.
Figure 7:
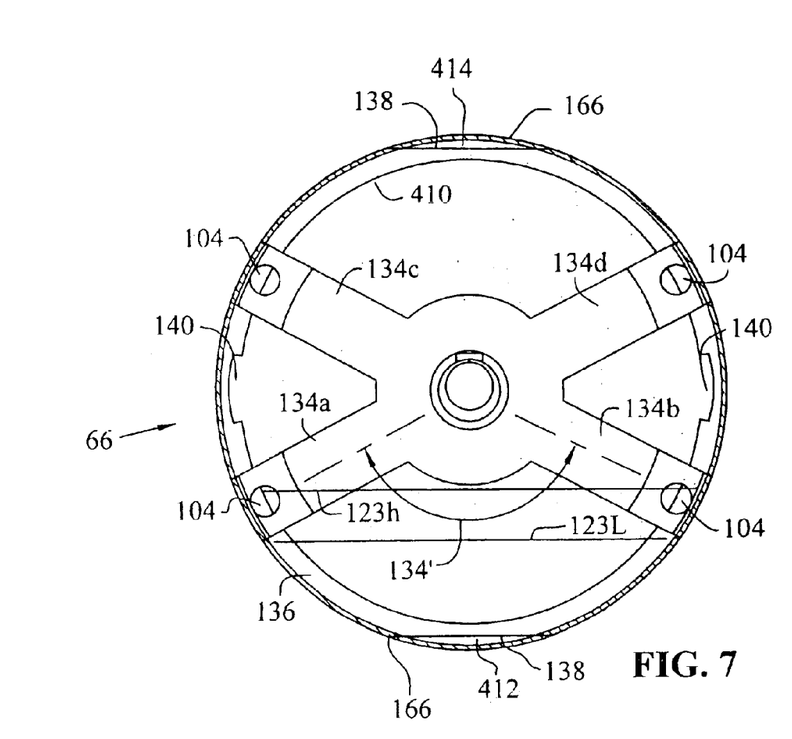
FIG. 7 is a side view of the bearing support of FIG. 5.
Figure 8:
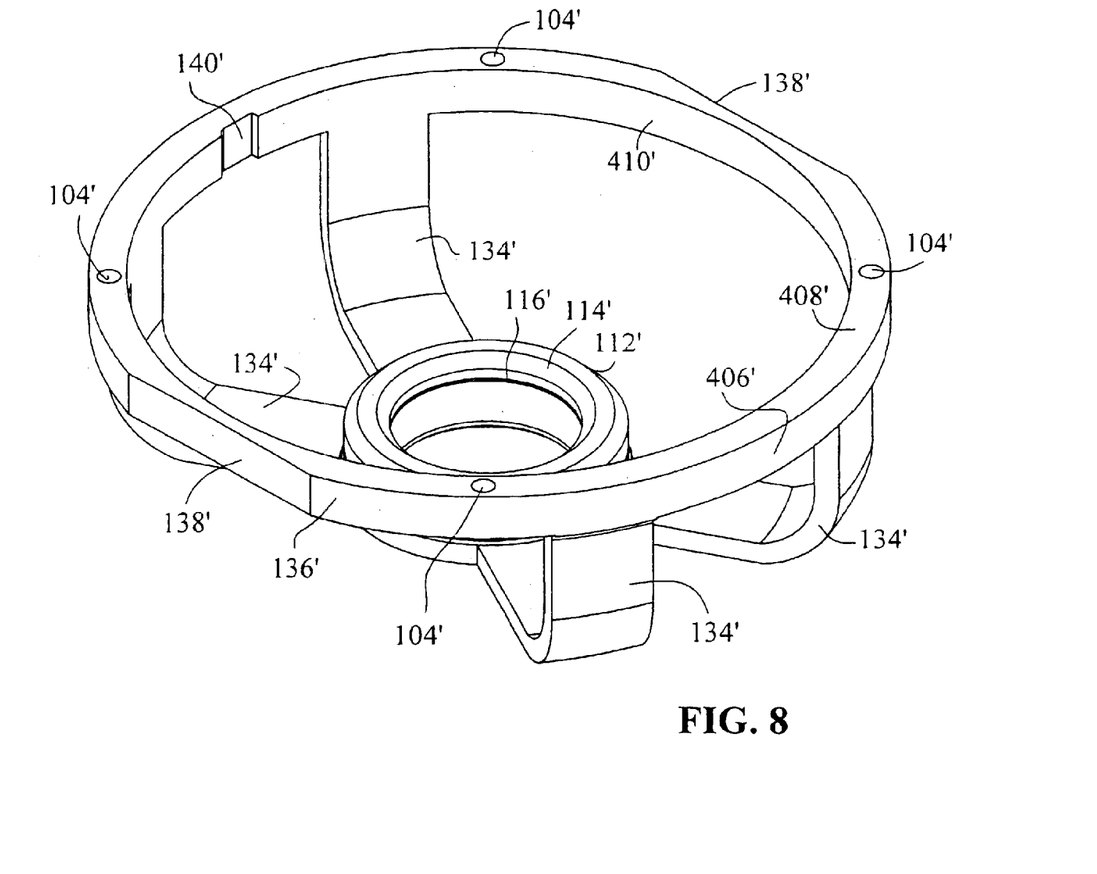
FIG. 8 is a perspective view of second embodiment of a bearing support.
Figure 9:
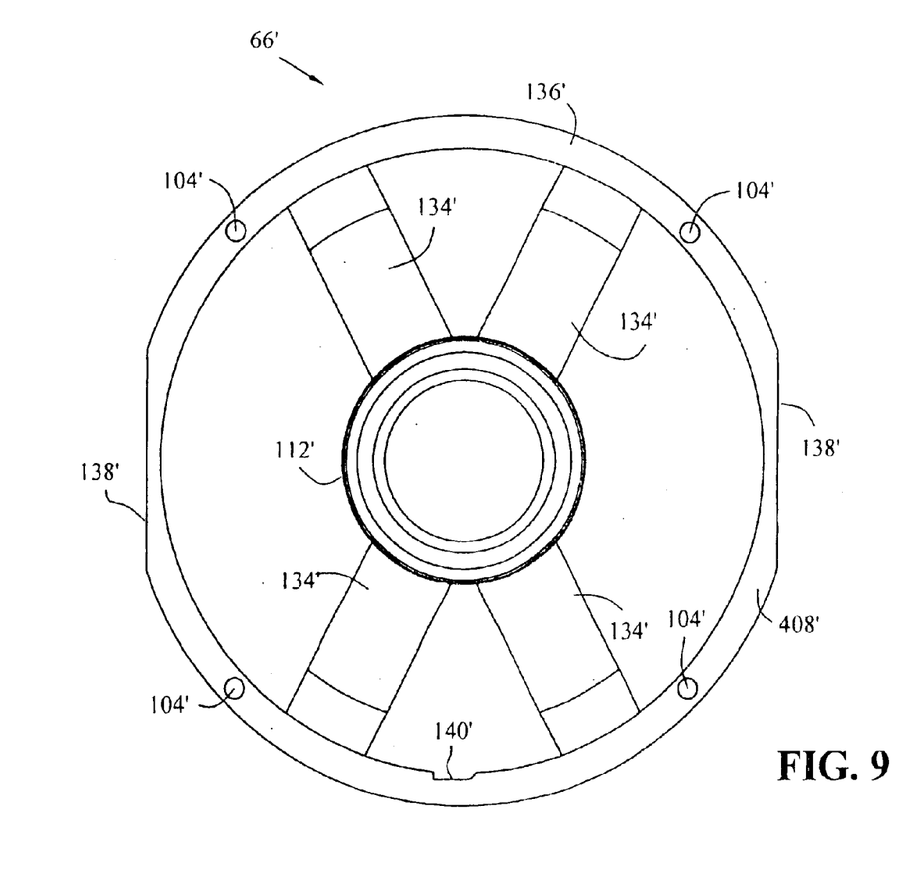
FIG. 9 is a front view of the bearing support of FIG. 8.
Figure 10:
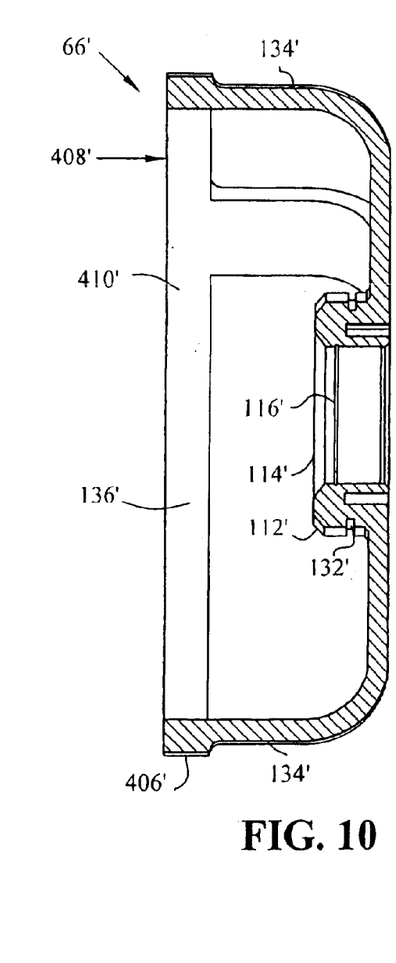
FIG. 10 is a cross sectional side view of the bearing support of FIG. 8.

Support arms 134 are positioned such that the two lowermost arms 134 form an angle of approximately 120 degrees to limit the extent to which the two lowermost arms 134 extend into the oil in sump 58 and thereby limit the displacement of oil within oil sump 58 by such arms 134. A sleeve 142 projects rearwardly from bearing support 66 and provides for uptake of lubricating oil from oil sump 58. An oil pick up tube 144 is secured to sleeve 142 with a threaded fastener 146. An O-ring 148 provides a seal between oil pick up tube 144 and sleeve 142. As shown in FIG. 1, secured within a bore in sleeve and positioned near the end of shaft 46 are vane 150, reversing port plate 152, pin 154, washer and wave spring 156, and retaining ring 158 which facilitate the communication of lubricating oil through sleeve 112. Although appearing as one part in FIG. 1, washer and wave spring 156 are two separate parts wherein the washer is a flat circular part which does not include a central opening while the wave spring is formed from a sheet material and has a circular outer perimeter and central opening and circumferentially extending undulations. Such washers and wave springs are known in the art. Oil pick up tube is received in opening 145 and fastener 146 is received in opening 147. FIGS. 5–7 further illustrate bearing support 66.

During manufacture, a compressor and motor subassembly is assembled by fitting outer ring 136 over a reduced diameter portion 402 of stator 92 and properly located using bushings 96 and abuts central portion 404 of stator 92. Similarly legs 78 of crankcase 62 are properly located using bushings 96 and abut central portion 404 of stator 92. Bolts 98 are then inserted through openings 104 of outer ring 136 and openings 102 of stator 92 and threaded into tight engagement with threaded bores located in legs 78. As bolts 98 are tightened, outer ring 136 is brought into tight engagement with central portion 404 of stator 92. Fixed scroll 22 is secured to crankcase with bolts 72 prior to positioning the compressor and motor subassembly into housing 88. Cylindrical portion 166 of housing 88 is heated prior to inserting the compressor and motor assembly therein. As cylindrical portion 166 cools and shrinks, cylindrical portion firmly engages crankcase 62 and radially outer surface 406 of outer ring 136.

The bearing support may also include one or more circumferentially spaced recesses in the surface of the outer ring which bears against the stator whereby any bulges in the laminations of the stator caused by the securing of the bearing support against the stator may project into the recesses. The use of such recesses is described by Skinner et al. in U.S. patent application Ser. No. 10/617,475 entitled BEARING SUPPORT AND STATOR ASSEMBLY FOR COMPRESSOR which is hereby incorporated herein by reference.

Once assembled, outer ring 136 engages housing 88 and also has a surface 408 which engages one end of stator core 404. Stator core 404 supports stator windings 402 which are schematically illustrated in the Figures as the reduced diameter portions of stator 92 extending from opposite ends of stator core 404. When surface 408 of outer ring 136 is engaged with stator core 404, radially inner surface 410 of outer ring 136 faces windings 402 of stator 92. As shown in FIG. 6, lowermost support arms 134a and 134b form an angle 134' which is approximately 120 degrees. This configuration of support arms 134a and 134b raises the location of where support arms 134a and 134b join outer support ring 136 to a point above oil sump 58 or to a point which reduces the extent to which support arms 134a and 134b extend into and displace oil located in oil sump 58. In the embodiment disclosed in FIGS. 5–7, upper support arms 134c and 134d form an angle therebetween which is also approximately 120 degrees. Consequently the angle between arms 134a and 134c and between arms 134b and 134d have a magnitude which is less than 120 degrees.

By using lowermost support arms 134a and 134b which are positioned at a relatively large angle with respect to each other, support arms 134a and 134b do not displace any oil within sump 58, or, displace only a limited quantity of oil within sump 58. This limited displacement of oil within sump 58 is advantageous because it is desirable to prevent oil from entering the bore defined by stator 92 within which rotor 94 is located and by minimizing the displacement of oil within sump 58 by legs 134a and 134b, the upper surface of the oil present in oil sump 58 will be lower for a given quantity of oil in sump 58 than for a compressor having a bearing support with support arms which occupy a greater volume of space in the lower portion of interior plenum 39.

Shown in FIG. 7 are two oil levels, 123H and 123L which may be present in compressor 20 at the location of support arms and which would define the upper level of oil sump 58 within housing 88. Oil level 123L represents a lower oil level at which lowermost support arms 134a and 134b do not enter sump 58 while oil level 123H represents a higher oil level at which lowermost arms 134a and 134b do displace a relatively small volume of oil located within sump 58. As also can be seen in FIG. 7, outer ring 136 is spaced apart from cylindrical portion 166 of housing 88 at flats 138 to thereby define oil passage 412 and refrigerant passage 414 between outer ring 136 and housing 88. Passage 412 is located along the lowermost portion of outer ring 136 which extends between support arms 134a and 134b and allows oil to pass between outer ring 136 and housing 88. Passage 414 is located above oil sump 58 between outer ring 136 and housing 88 and allows refrigerant to be communicated therethrough and thus equalize the pressure within suction plenum 39 on opposite sides of outer ring 136. Stator core 404 also includes flats distributed along its exterior perimeter to define passages between stator core 404 and cylindrical portion 166 of housing 88 along both the lower portions of stator core 404, to permit the passage of oil, and along the upper portions of stator core 404 to permit the passage of refrigerant.

Figure 11:
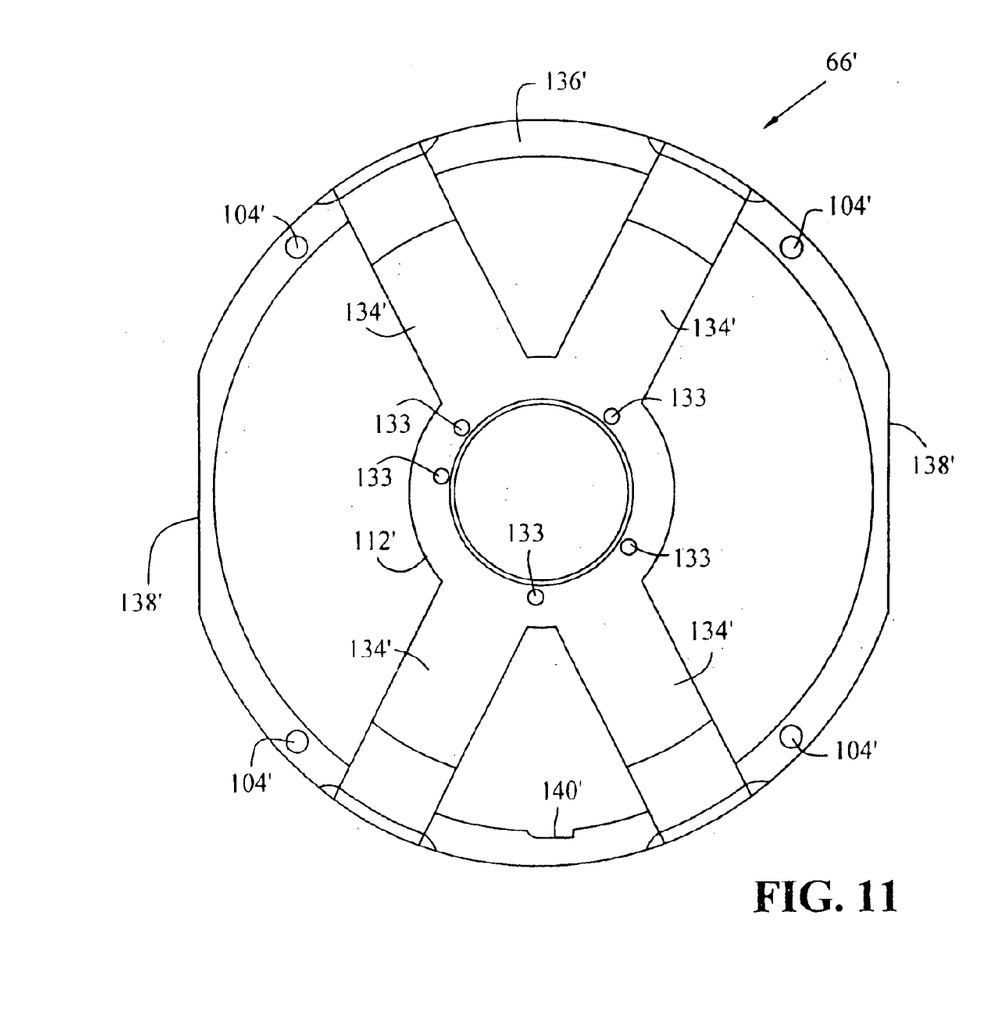
FIG. 11 is a rear view of the bearing support of FIG. 8.

A second embodiment of a bearing support 66' is shown in FIGS. 8–11. Those features of the second embodiment which are similar to the first embodiment use prime reference numerals wherein the reference numeral is the same as in the first embodiment and a description of these common features is not repeated. As can be seen in FIG. 11, the rear surface of bearing support 66' includes a plurality of bores 133 circumferentially disposed about the rear surface of boss 112'. Bores 133 can be used to attach an oil pick up mechanism similar that used with bearing support 66 which in the embodiment disclosed in FIGS. 5–7 is attached to an integral portion of bearing support 66 which extends rearwardly of boss 112. A variety of oil pick up mechanisms are known in the art and alternative mechanisms may also be employed with bearing support 66'. Outer ring 136' and support arms 134' also differ from outer ring 136 and support arms 134 of bearing support 66 in that openings 104' do not intersect support arms 134'.

Figure 3:
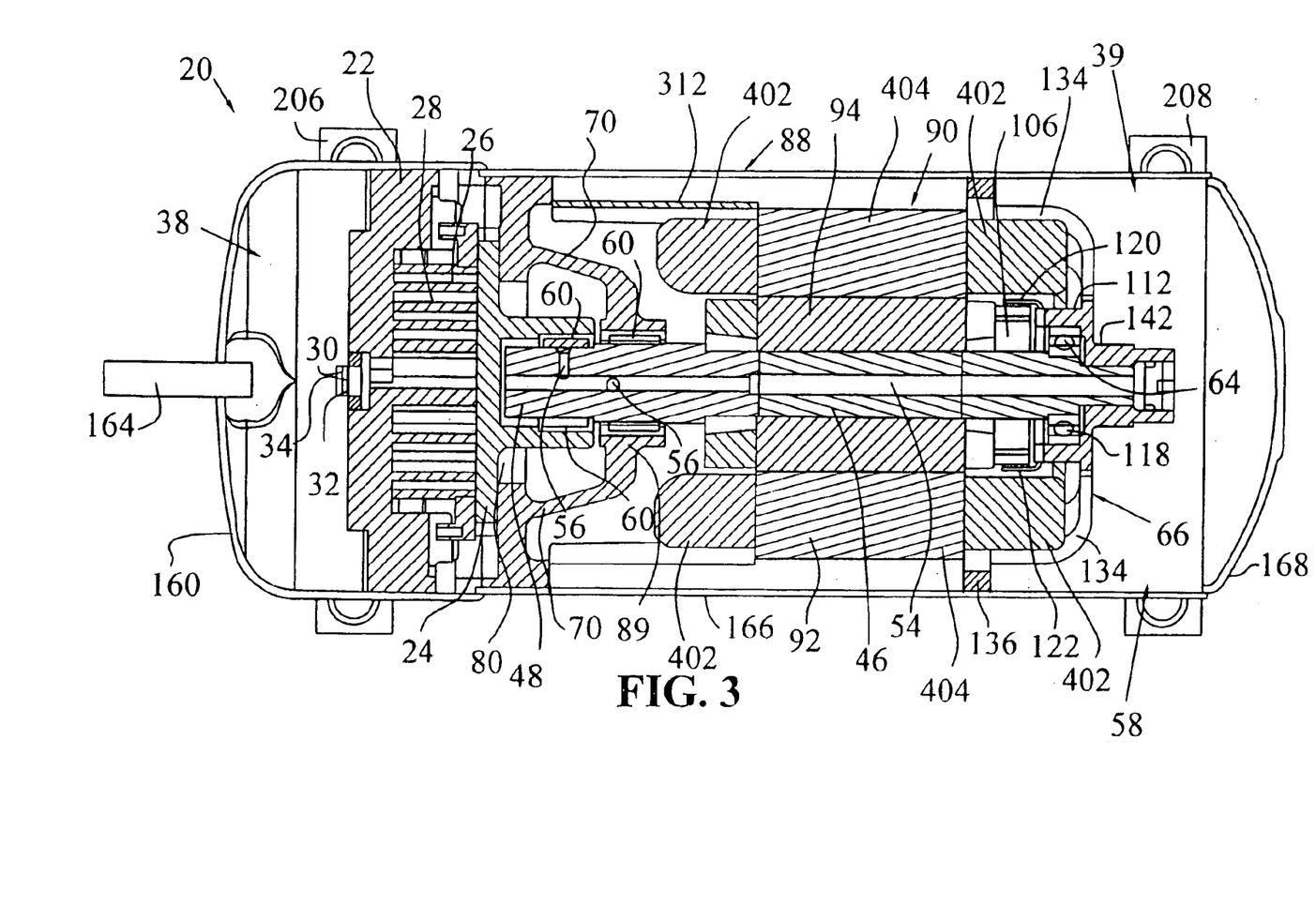
FIG. 3 is a sectional view of the compressor of FIG. 2 taken along line 3—3.

As can be seen in FIGS. 3 and 4, compressor housing 88 includes a discharge end cap 160 having a relatively flat portion 162. Housing 88 also includes a cylindrical shell 166 and rear end cap 168. End caps 160, 168 are welded to cylindrical shell 166 to provide an hermetically sealed enclosure. A discharge tube 164 extends through an opening in flat portion 162. The securement of discharge tube 164 to end cap 160 by welding or brazing is facilitated by the use of flat portion 162 immediately surrounding the opening through which discharge tube 164 is positioned.

After the compressor and motor subassembly is assembled and shrink-fitted into cylindrical housing shell 166, fixed scroll member 22 is positioned within discharge end cap 160 and tightly engages the interior surface of end cap 160. Discharge plenum 38 is formed between discharge end cap 160 and fixed scroll member 22. As compressed refrigerant is discharged through discharge port 30 it enters discharge plenum 38 and is subsequently discharged from compressor 20 through discharge tube 164. Compressed refrigerant carries oil with it as it enters discharge plenum 38. Some of this oil will separate from the refrigerant and accumulate in the bottom portion of discharge plenum 38. Discharge tube 164 is located near the bottom portion of discharge plenum 38 so that the vapor flow discharged through tube 164 will carry with it oil which has settled to the bottom portion of discharge plenum 38 and thereby limit the quantity of oil which can accumulate in discharge plenum 38. Although the disclosed embodiment utilizes a short, straight length of tubing to provide discharge tube 164, alternative embodiments of the discharge outlet may also be used. A discharge plenum configuration which may be used with compressor 20 is described by Skinner in U.S. Provisional Patent Application Ser. No. 60/412,871 entitled COMPRESSOR DISCHARGE ASSEMBLY filed Sep. 23, 2002 which is hereby incorporated herein by reference.

Figure 2:
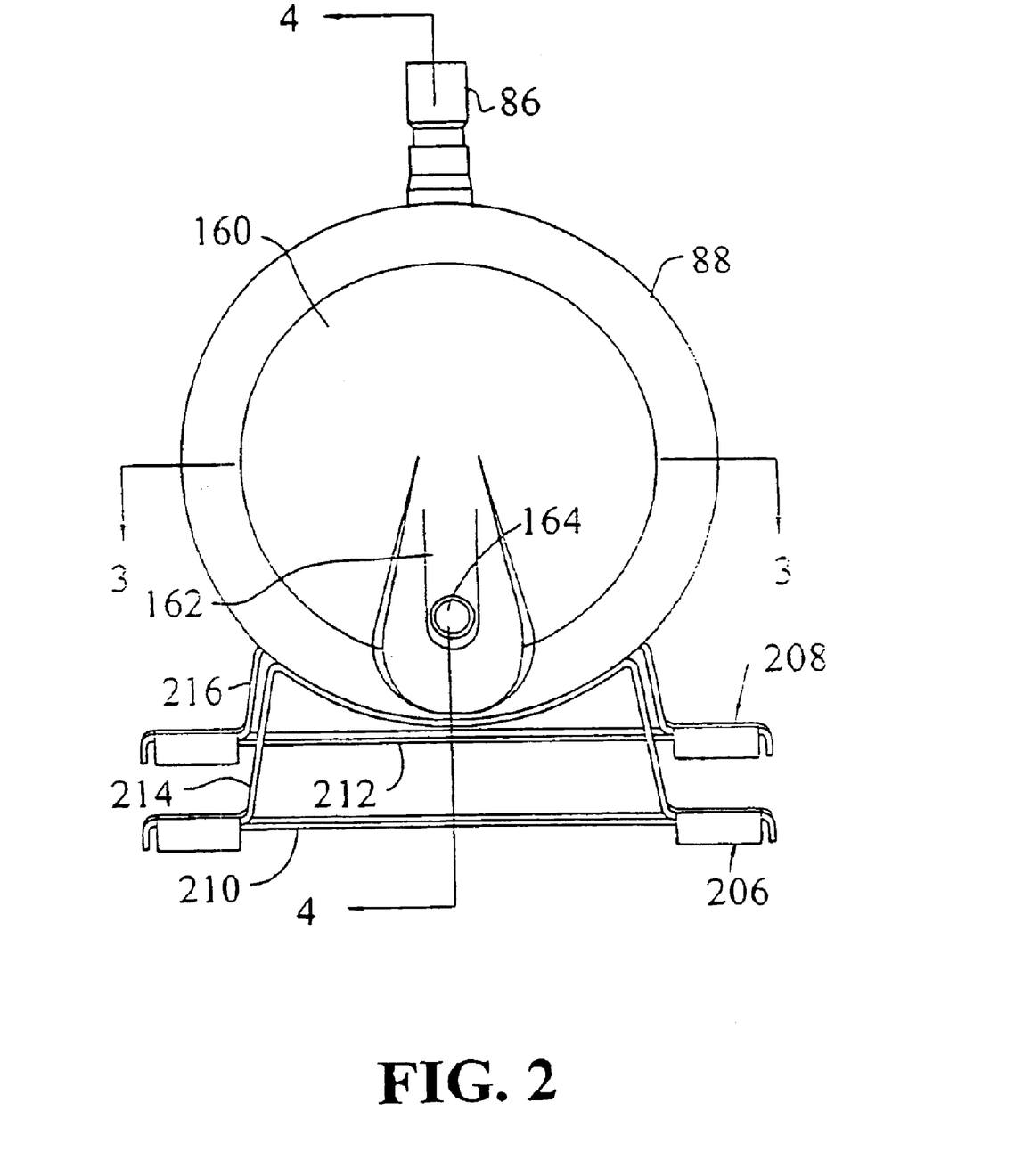
FIG. 2 is an end view of the compressor of FIG. 1.

Mounting brackets 206 and 208 are welded to housing 88 and support compressor 20 in a generally horizontal orientation. As can be seen in FIG. 4, however, mounting brackets 206, 208 have legs which differ in length such that the axis of shaft 46 defined by passage 54 while substantially horizontal will be positioned at an incline. The configuration of brackets 206, 208 are such that the portion of low pressure plenum 39 positioned below bearing support 66 and which defines oil sump 58 will be the lowermost portion of compressor 20. Bottom brace members 210, 212 may be secured to support members 214, 216 (FIG. 2) by a swaging operation. The mounting brackets used with compressor 20 may be those described by Skinner in U.S. Provisional Patent Application Ser. No. 60/412,884 entitled COMPRESSOR MOUNTING BRACKET AND METHOD OF MAKING filed Sep. 23, 2002 which is hereby incorporated herein by reference. Alternative mounting brackets may also be employed. For example, mounting brackets formed by support members similar to members 214 and 216 but which have been given greater rigidity by bending their outer edges downward along the full length of the support members may be used without a crossbrace to support compressor 20.

While this invention has been described as having an exemplary design, the present invention may be further modified within the spirit and scope of this disclosure. This application is therefore intended to cover any variations, uses, or adaptations of the invention using its general principles.

What is claimed is:

1. A horizontal compressor assembly comprising:
   a housing defining an interior plenum, a lower portion of said plenum defining an oil sump;
   a compressor mechanism disposed within said housing;
   a motor disposed within said housing;
   a shaft having a first end and an opposite second end, said first end operably coupled to said compressor mechanism, said shaft extending through said motor and operably coupled thereto, said second end extending outwardly from said motor, said shaft defining a rotational axis having a substantially horizontal orientation; and
   a bearing support secured within said housing, said bearing support including a radially inner shaft support member, a radially outer support member, and plurality of support arms extending between said inner and outer support members, said outer support member having a radially outer surface, a substantial portion of said radially outer surface engaged with said housing, said radially outer surface and said housing defining a first gap therebetween proximate a lowermost portion of said outer support member and wherein said lowermost portion extends freely through an arc of at least approximately 120 degrees between lowermost adjacent ones of said plurality of support arms.

2. The compressor assembly of claim 1 wherein said interior plenum defines a low pressure chamber and a high pressure chamber, said motor, said shaft, said oil sump and said bearing support all disposed in said low pressure chamber.

3. The compressor assembly of claim 1 wherein said compressor mechanism comprises a fixed scroll member secured within said housing and an orbiting scroll member secured within said housing, said orbiting scroll member engaged with said fixed scroll member and operably coupled to said first end of said shaft.

4. The compressor assembly of claim 1 wherein said radially outer surface of said outer support member and said housing define a second gap disposed vertically above said oil sump.

5. The compressor assembly of claim 1 wherein said plurality of support arms define a plurality of angles between adjacent pairs of said support arms, said plurality of angles comprising at least two angles having different magnitudes.

6. A compressor assembly comprising:
   a housing defining an interior plenum, said plenum having a low pressure chamber and a discharge pressure chamber, a portion of said low pressure chamber defining an oil sump;
   a compressor mechanism disposed within said housing;
   a motor disposed within said housing;
   a shaft having a first end and an opposite second end, said first end operably coupled to said compressor mechanism, said shaft extending through said motor and operably coupled thereto, said second end extending outwardly from said motor, said shaft defining a rotational axis having a substantially horizontal orientation; and
   a bearing support secured within said housing, said bearing support including a radially inner shaft support member, a radially outer support member, and a plurality of support arms extending between said inner and outer support members, said outer support member having a radially outer surface, a substantial portion of said radially outer surface engaged with said housing, said radially outer surface and said housing defining a first gap therebetween proximate a lowermost portion of said outer support member such that oil in said oil sump is permitted to flow between said radially outer surface and said housing through said first gap, said lowermost portion being positioned within said oil sump.

7. The compressor assembly of claim 6 wherein said lowermost portion of said bearing support extends freely through an arc of at least approximately 120 degrees between lowermost adjacent ones of said plurality of support arms.

8. The compressor assembly of claim 6 wherein said bearing support, said motor and said shaft are all disposed in said low pressure chamber.

9. The compressor assembly of claim 6 wherein said compressor mechanism comprises a fixed scroll member secured within said housing and an orbiting scroll member secured within said housing, said orbiting scroll member engaged with said fixed scroll member and operably coupled to said first end of said shaft.

10. The compressor assembly of claim 6 wherein said radially outer surface of said outer support member and said housing define a second gap disposed vertically above said oil sump.

11. A compressor assembly comprising:
    a housing including a substantially cylindrical section and defining an interior plenum, said plenum having a low pressure chamber and a discharge pressure chamber, a lower portion of said plenum defining an oil sump;

a compressor mechanism disposed within said housing;

a motor disposed within said housing;

a shaft having a first end and an opposite second end, said first end operably coupled to said compressor mechanism, said shaft extending through said motor and operably coupled thereto, said second end extending outwardly from said motor, said shaft defining a rotational axis having a substantially horizontal orientation; and a bearing support secured within said substantially cylindrical section of said housing, said bearing support including a radially inner shaft support member, a substantially circular radially outer support member, and plurality of support arms extending between said inner and outer support members, said outer support member having a radially outer surface, a substantial portion of said radially outer surface engaged with said housing, said radially outer surface and said housing defining a first gap therebetween proximate a lowermost portion of said outer support member and wherein said lowermost portion extends freely through an arc of at least approximately 120 degrees between lowermost adjacent ones of said plurality of support arms, said lowermost portion being positioned within said oil sump.

12. The compressor assembly of claim 11 wherein said bearing support, said motor and said shaft are all disposed in said low pressure chamber.

13. The compressor assembly of claim 11 wherein said compressor mechanism comprises a fixed scroll member secured within said housing and an orbiting scroll member secured within said housing, said orbiting scroll member engaged with said fixed scroll member and operably coupled to said first end of said shaft.

14. The compressor assembly of claim 11 wherein said radially outer surface of said outer support member and said housing define a second gap disposed vertically above said oil sump.

* * * * *